United States Patent
Norrell et al.

(10) Patent No.: US 6,874,096 B1
(45) Date of Patent: Mar. 29, 2005

(54) APPARATUS AND METHOD FOR DETECTING PACKET ARRIVAL TIME

(75) Inventors: Andrew L. Norrell, Nevada City, CA (US); Scott A. Lery, Nevada City, CA (US); Philip DesJardins, Nevada City, CA (US)

(73) Assignee: 2Wire, Inc., San Jose, CA (US)

( * ) Notice: Subject to any disclaimer, the term of this patent is extended or adjusted under 35 U.S.C. 154(b) by 577 days.

(21) Appl. No.: 09/887,283

(22) Filed: Jun. 21, 2001

Related U.S. Application Data

(60) Provisional application No. 60/213,820, filed on Jun. 23, 2000.

(51) Int. Cl.[7] .............................................. G06F 15/16
(52) U.S. Cl. ...................... 713/400; 370/232; 370/233; 370/252; 370/508; 370/517; 370/395.64; 375/354; 379/25
(58) Field of Search ............................... 713/400, 600, 713/601; 370/232, 233, 252, 508, 517, 395.64; 375/354; 379/25

(56) References Cited

U.S. PATENT DOCUMENTS

| | | | |
|---|---|---|---|
| 5,025,457 A | * 6/1991 | Ahmed | 375/354 |
| 5,247,464 A | * 9/1993 | Curtis | 379/25 |
| 5,381,407 A | * 1/1995 | Chao | 370/233 |
| 5,566,180 A | 10/1996 | Eidson et al. | |
| 5,659,573 A | 8/1997 | Bruckert et al. | |
| 5,799,011 A | 8/1998 | LaRosa et al. | |
| 5,802,106 A | * 9/1998 | Packer | 375/225 |
| 5,966,387 A | * 10/1999 | Cloutier | 370/516 |
| 6,069,902 A | 5/2000 | Kurano et al. | |
| 6,091,742 A | * 7/2000 | Bassat et al. | 370/516 |
| 6,305,233 B1 | 10/2001 | Braathen et al. | |
| 6,347,091 B1 | 2/2002 | Wallentin et al. | |
| 6,580,694 B1 | * 6/2003 | Baker | 370/252 |
| 6,687,752 B1 | * 2/2004 | Falco et al. | 709/230 |
| 6,690,683 B1 | * 2/2004 | Brunheroto et al. | 370/542 |
| 6,724,726 B1 | * 4/2004 | Coudreuse | 370/235 |

* cited by examiner

*Primary Examiner*—A. Elamin
(74) *Attorney, Agent, or Firm*—Blakely, Sokoloff, Taylor & Zafman LLP

(57) ABSTRACT

A detector for detecting packet arrival time for packets received by a Home Phoneline Network Alliance (HPNA) receiver. The detector correlates received preamble symbols with stored preamble symbols and generates an estimation of the packet arrival time when the entire transmitted preamble has arrived at the receiver. The estimation of the packet arrival time is defined on a symbol period boundary. The detector includes a complex correlator with a simplified structure based on characteristic of the received HPNA signal.

21 Claims, 5 Drawing Sheets

US 6,874,096 B1

APPARATUS AND METHOD FOR DETECTING PACKET ARRIVAL TIME

CROSS REFERENCE TO RELATED APPLICATION

This application is related to, and claims the benefit of, U.S. Provisional Patent Application Ser. No. 60/213,820, entitled "System And Method For Detecting Packet Arrival Time," filed on Jun. 23, 2000, the subject matter of which is incorporated by reference. This application is also referred to co-pending U.S. patent application Ser. No. 09/893,101, entitled "Robust Packet Arrival Time Detector Using Estimated Signal Power," filed Jun. 26, 2001, the subject matter of which is incorporated by reference. The related applications are commonly assigned.

BACKGROUND

1. Technical Field

The present invention relates generally to computer networking devices and more particularly to a packet arrival time detector for use in a Home Phoneline Network Alliance (HPNA) receiver.

2. Description of the Background Art

Digital communication systems over a shared medium transmit information organized into discrete packets. To recover the information, a receiver must be able to determine when packets arrive, and to distinguish packets from noise. In general, the receiver must determine a Packet Arrival Time (PAT) for each received packet, since the packets might be transmitted from different asynchronous sources. The PAT is commonly used by sections of the receiver to prepare for the onset of the information-bearing portion of the packet. For example, an equalizer can use the PAT as an indicator of when to start training. In this situation, the more accurate the PAT, the faster the equalizer will converge before the onset of information, which makes the receiver less prone to packet errors.

A receiver typically detects the arrival time of signals, such as packets, using a correlator. Correlators compare, or correlate, a received signal with a known signal stored at the receiver. Among other things, correlators multiply samples of a received signal with samples of a known signal and then sum the products. Correlators commonly receive complex signals including real and imaginary components, and thus require many multipliers to perform correlations. Multipliers are typically costly components due to their large space and power requirements. Thus there exists a need for an economical and efficient packet arrival time detector.

SUMMARY OF THE INVENTION

A system and method for detecting arrival time of a packet are disclosed. The method for detecting arrival time of a packet including a preamble comprises receiving and demodulating a signal, correlating the demodulated received signal with a stored preamble to produce a correlated output, determining a maximum of the correlated output during a symbol period of L samples, and comparing the index of the maximum to a value of a modulo-L counter to produce a packet arrival time at a symbol period boundary of the received signal.

Correlating the demodulated received signal with the stored preamble includes alternately selecting real and imaginary components of the demodulated received signal and quantizing the real and imaginary components to one bit. The sign bit of the real and imaginary components are used as the quantized real and imaginary components. In one embodiment of the system of the invention, M quantized real and imaginary components are sequentially stored in a shift register, where M=NL, N is the number of complex preamble symbols and L is the ratio of the sampling rate to the symbol rate (interpolation ratio).

N of the M quantized real and imaginary components are selectively multiplied with the complex preamble symbols quantized to one bit. The one-bit quantization of the received signal samples and the stored preamble symbols removes the need for actual physical multipliers. The products are selectively added to produce a real correlator output and an imaginary correlator output.

The real correlator output and the imaginary correlator output are summed to produce a correlated output that is input to a peak detector. The peak detector determines an index of a maximum of the correlated output during a window of period W (W samples). The peak detector then compares the index of the maximum with the value of a modulo-L counter and outputs the difference as a packet arrival time estimate. In one embodiment, the packet arrival time detector adjusts a variable sample delay such that the correlation matches the symbol boundaries. The packet arrival time estimate of the invention is referred to a symbol period boundary, even if an equalizer in the receiver is fractionally spaced.

DETAILED DESCRIPTION OF THE DRAWINGS

Figure 1:
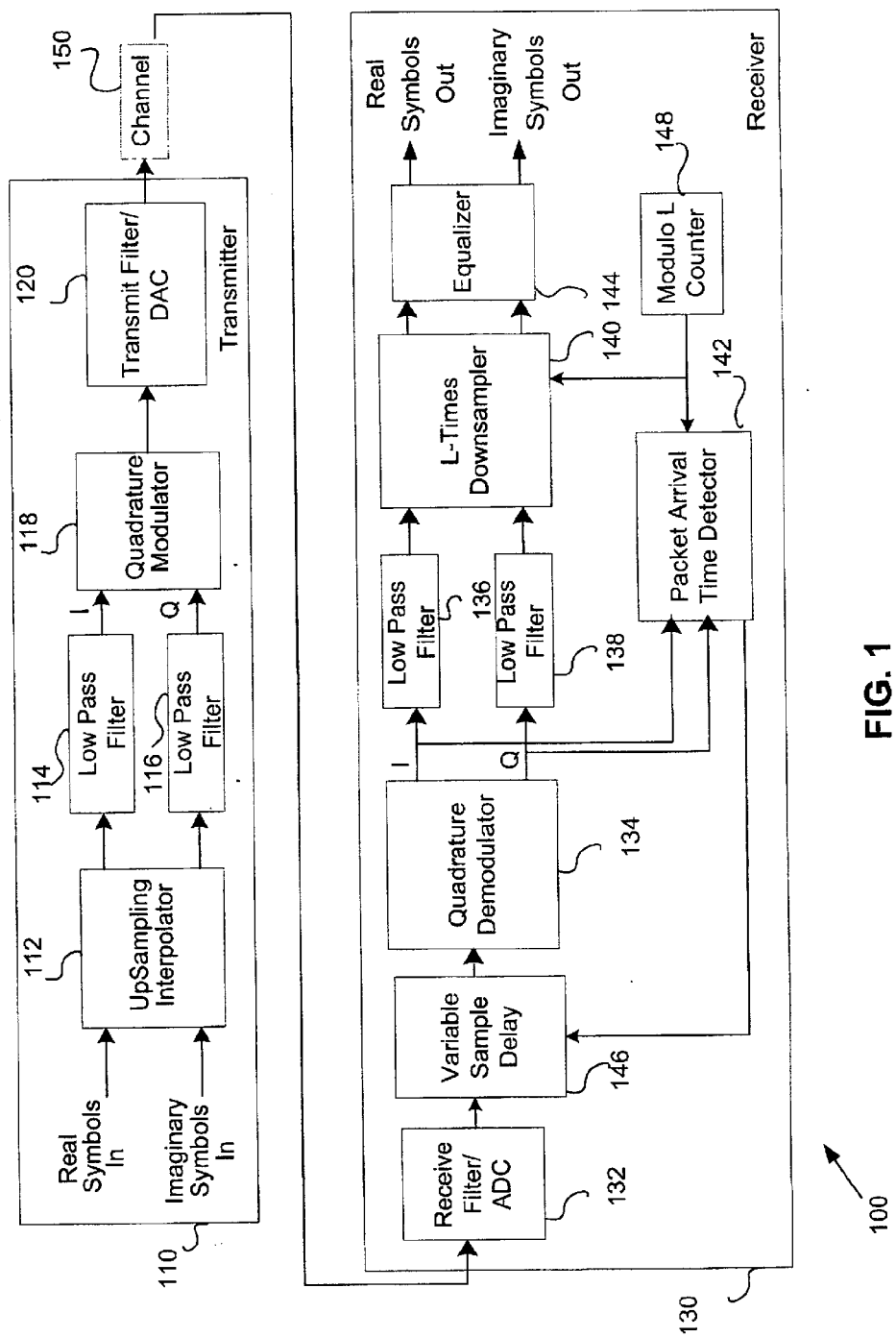
FIG. 1 is a block diagram of one embodiment of a communication system including a receiver that incorporates a Packet Arrival Time Detector, in accordance with the invention.

FIG. 1 is a block diagram of one embodiment of a communication system 100 including a receiver configured to detect a packet arrival time, in accordance with the invention. Communication system 100 includes a transmitter 110 (such as an HPNA transmitter) for transmitting information in discrete packets, a receiver 130 (such as an HPNA receiver) for receiving the packets from the transmitter 110, and a channel 150 for communicatively connecting transmitter 110 with receiver 130.

Transmitter 110 includes, but is not limited to, an up-sampling interpolator 112, two low pass filters 114 and 116, a quadrature modulator 118, and a transmit filter/DAC (Digital-to-Analog-Converter) 120. The information in a packet is represented as a sequence of symbols. To facilitate determining the arrival time of a packet, a sequence of known symbols called a "preamble" is added in front of the information portion of the packet. For example, in one embodiment of an HPNA packet, the preamble is the first 64 symbols of the packet. The size and contents of the preamble are specified in the HPNA specifications, for example "Interface Specification for HomePNA 2.02.7 10M8 Technology"

by Home Phoneline Networking Alliance, hereby incorporated by reference.

A complex encoder (not shown) encodes the bits of a packet, including the preamble, as complex symbols, including real symbols (i.e., an in-phase component) and imaginary symbols (i.e., a quadrature component). Therefore, the input signals at up-sampling interpolator 112 consist of two components, namely, real symbols and imaginary symbols. Up-sampling interpolator 112 increases the sampling rate of the input symbols by interpolating new samples between each adjacent sample in the input symbols, producing up-sampled real samples and up-sampled imaginary samples. Low pass filters 114 and 116 perform pulse shaping over the up-sampled real samples and up-sampled imaginary samples, respectively.

Upon receiving the filtered real and imaginary samples from low pass filters 114 and 116, quadrature modulator 118 performs bandpass modulation to convert the filtered real and imaginary samples to a signal that is compatible with the transmission requirements imposed by channel 150. Since the real and imaginary samples are orthogonal to each other, quadrature modulator 118 modulates these two sample streams into one signal. Specifically, quadrature modulator 118 modulates the real samples with a cos $\omega_o t$ signal, and the imaginary samples with a ($-\sin \omega_o t$) signal. Quadrature modulator 118 then combines these two modulated signals into one signal stream. Since the modulated signal generated by quadrature modulator 118 is a digital signal, transmit filter/DAC 120 converts it into an analog signal and then performs pulse shaping over the analog signal to ensure that the transmission bandwidth of the analog signal is contained within a desired spectral region. Finally, transmitter 110 sends the analog signal to receiver 130 through channel 150.

Receiver 130 includes a receive filter/ADC (Analog-to-Digital-Converter) 132, a variable sample delay 146, a quadrature demodulator 134, two low pass filters 136 and 138, an L-times downsampler 140, an equalizer 144, a modulo L counter 148, and a packet arrival time detector 142. Upon receiving the analog signal from channel 150, receive filter/ADC 132 removes unwanted high frequency signals from the analog signal and then converts the analog signal to digital samples at a sampling rate that matches the sampling rate of transmitter 110. Variable sample delay 146 delays the sampled signal a variable number of samples from 0 to L-1, where L is the ratio of the sample rate to the symbol rate. Specifically, the delay that variable sample delay 146 provides is set by a packet arrival time signal sent from packet arrival time detector 142. In an alternate embodiment of receiver 130, the packet arrival time signal from packet arrival time detector 142 is input to equalizer 144.

Quadrature demodulator 134 removes the carrier signal from the received signal and generates the real and imaginary (in-phase and quadrature) components of the recovered signal. Low pass filters 136 and 138 filter the recovered real and imaginary samples, respectively. L-times down-sampler 140 then down-samples the complex samples to produce recovered real and imaginary symbols, where the ratio of samples to symbols is L. L-times downsampler 140 outputs a complex signal to equalizer 144 whenever the value of modulo L counter 148 is zero; if equalizer 144 is fractionally-spaced, L-times downsampler 140 may output intermediate complex samples, but a symbol boundary is determined when the value of modulo L counter 148 is zero. Modulo L counter 148 is a free running modulo-L sample counter that is initially set to zero when receiver 130 is first powered up. The value of modulo L counter 148 is also input to packet arrival time detector 142 for use in determining the timing of the sample of maximum correlation relative to a symbol boundary.

Due to bandwidth limitations, channel 150 may cause amplitude or phase distortions in the transmitted analog signal. Such distortions can produce inter-symbol interference (ISI), where the pulses in the recovered baseband signal overlap or "smear" with each other. Equalizer 144 eliminates or reduces ISI in the recovered baseband signal.

Let a preamble with N complex symbols be given by a sequence, $\{H_n\}=\{H_n^I+jH_n^Q\}$, where j is defined as the square root of negative one. Due to the up-sampling process performed by up-sampling interpolator 112, zeros are effectively inserted between the complex symbols at the transmit sampling rate. To facilitate discussion, assume that the response of channel 150 is flat so that the preamble symbols only undergo a time shift (delay) without having phase and amplitude distortion. Thus, the outputs of quadrature demodulator 134 will be the preamble symbols with (L-1) zero padding, where L is the ratio of the sampling rate, $f_s$, to the symbol rate. That is, the received samples output from quadrature demodulator 134 are:

$$P^I_n = \ldots, 0, H_o^I, \ldots, 0, H_1^I, 0, 0, 0, \ldots H^I_{N-1}, 0, \text{ and}$$
$$P^Q_n = \ldots, 0, H_o^Q, 0, 0, 0, \ldots, 0, H_1^Q, 0, 0, 0, \ldots H^Q_{N-1}, 0, \ldots$$

where the $H_n^I$ and $H_n^Q$ are the in-phase and quadrature values of the preamble symbols, respectively. As shown, many of the received preamble samples have a value of zero.

Figure 2:
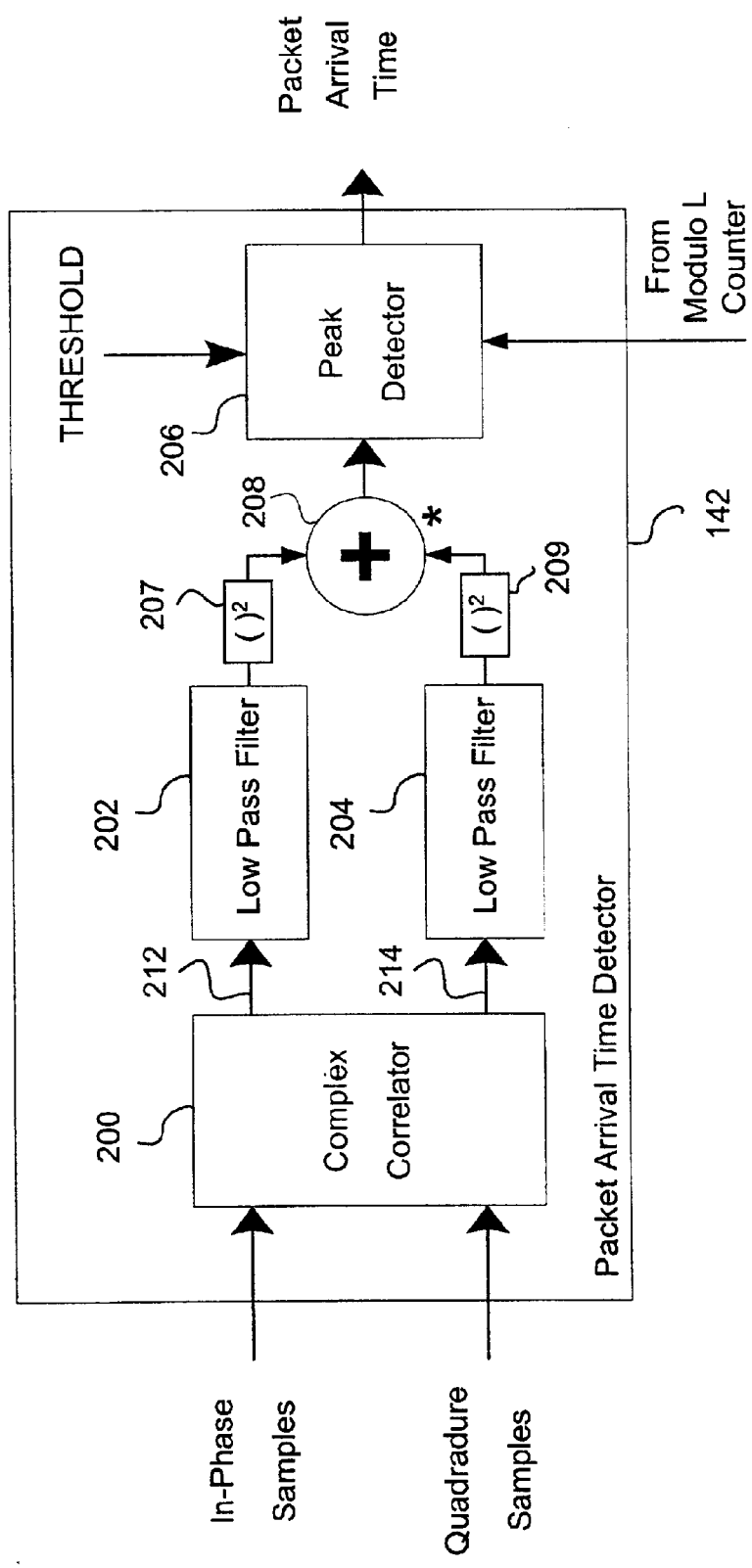
FIG. 2 is a block diagram of one embodiment of the Packet Arrival Time Detector of FIG. 1, in accordance with the invention.

FIG. 2 is a block diagram of one embodiment of packet arrival time detector 142 of FIG. 1, in accordance with the invention. Packet arrival time detector 142 includes a complex correlator 200, two low pass filters 202 and 204, two squaring devices 207 and 209, an adder 208 and a peak detector 206.

The recovered complex signals from quadrature demodulator 134 are input to complex correlator 200, which performs a correlation for each sample time, n, according to the equation:

$$Y_n = \sum_{K=0}^{NL-1} R_{K+n} P_K^*$$

where $R_K = R_K^I + jR_K^Q$ are the complex signals received from quadrature demodulator 134, $P_K^*$ are the complex conjugate preamble samples with zero padding, and NL=M are the total number of complex preamble samples that are used to generate the sum. A complex value of $Y_n$ is produced each sample time, n.

Specifically, complex correlator 200 generates a real output $Y_n^I$ on line 212 and an imaginary output $Y_n^Q$ on line 214. Since the recovered complex signals are low pass filtered before downsampling and equalization, low pass filters 202 and 204 filter the outputs of complex correlator 200. Squaring devices 207 and 209 square the outputs of low pass filters 202 and 204, respectively. Adder 208 sums the filtered and squared real output with the filtered and squared imaginary output to produce $|Y_n|^2$, which will be at its maximum at the moment when the entire preamble has arrived.

Peak detector 206 determines when $|Y_n|^2$ is a maximum and generates a Packet Arrival Time signal using a predetermined threshold value. The contents and functionality of peak detector 206 are further discussed below in conjunction with FIG. 5.

Figure 3:
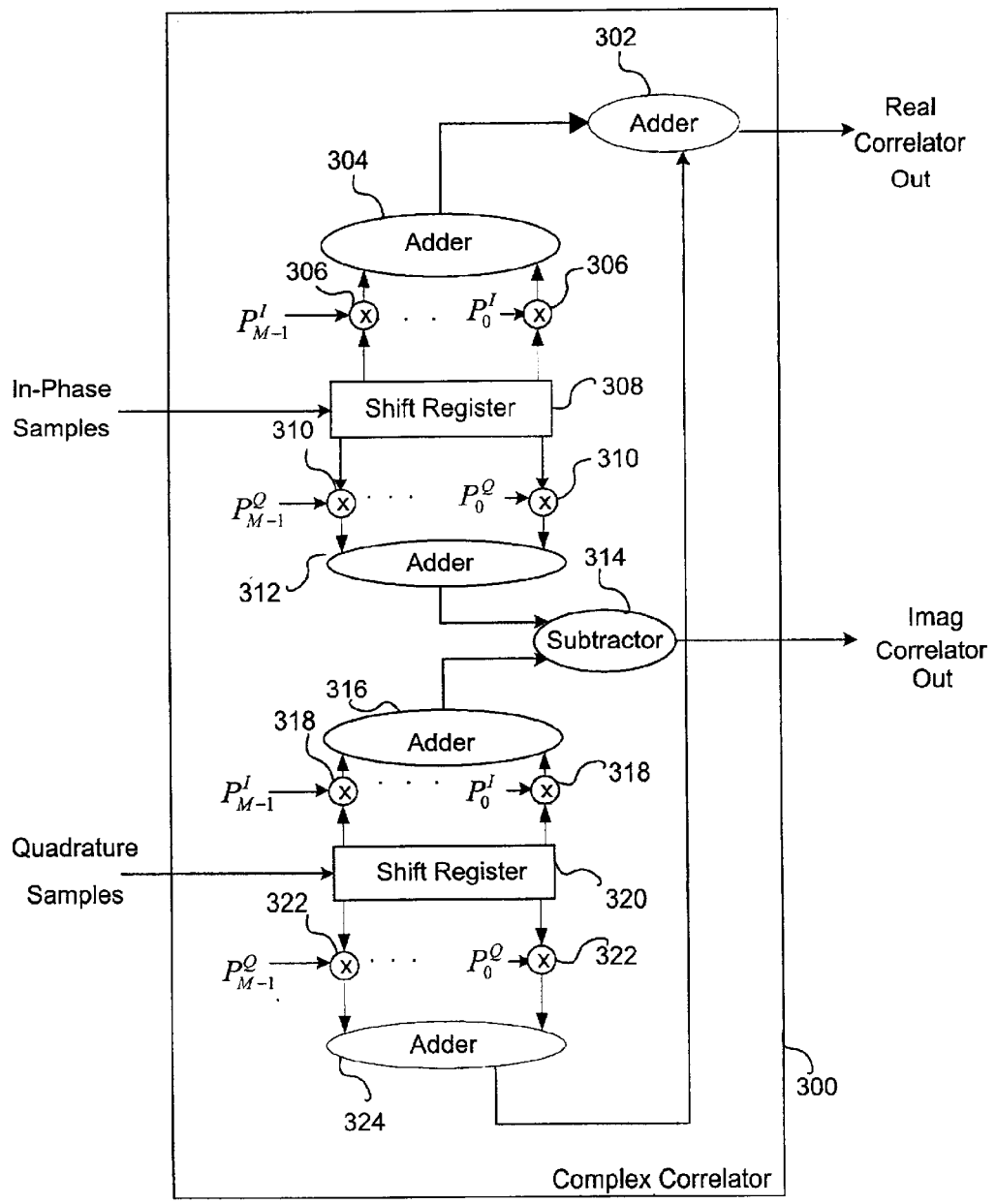
FIG. 3 is a block diagram of one embodiment of a complex correlator.

FIG. 3 is a block diagram of one embodiment of a prior art complex correlator 300 including two shift registers 308 and 320; four groups 306, 310, 318 and 322 of M multipliers; five adders 302, 304, 312, 316, and 324; and a subtractor 314. M (M=NL) real coefficients are applied to multiplier groups 306 and 318, and M imaginary coefficients are applied to multiplier groups 310 and 322. The M real and imaginary coefficients are the same as the M upsampled complex preamble symbols representing the preamble symbols appended to the packet by transmitter 110.

Shift registers 308 and 320 shift-in and store M recovered real samples and M recovered imaginary samples, respectively. Multiplier groups 306 and 310 multiply the M real received samples stored in shift register 308 with the M real preamble coefficients and the M imaginary preamble coefficients, respectively. Adder 304 sums together the products of multiplier group 306 and provides the sum to adder 302. Adder 312 sums together the products of multiplier group 310 and provides the sum to subtractor 314.

Multiplier groups 318 and 322 multiply the M imaginary received samples stored in shift register 320 with the M real preamble coefficients and the M imaginary preamble coefficients, respectively. Adder 316 sums together the products of multiplier group 318 and provides the sum to subtractor 314. Adder 324 sums together the products of multiplier group 322 and provides the sum to adder 302. Adder 302 generates a real output $Y_n^I$ by adding the sum of adder 324 to the sum of adder 304 and subtractor 314 generates an imaginary output $Y_n^Q$ by subtracting the output of adder 312 from the output of adder 316. As shown in FIG. 3, complex correlator 300 suffers the disadvantages of complexity and high manufacturing cost, due to the four groups of M multipliers and two shift registers of length M.

Figure 4:
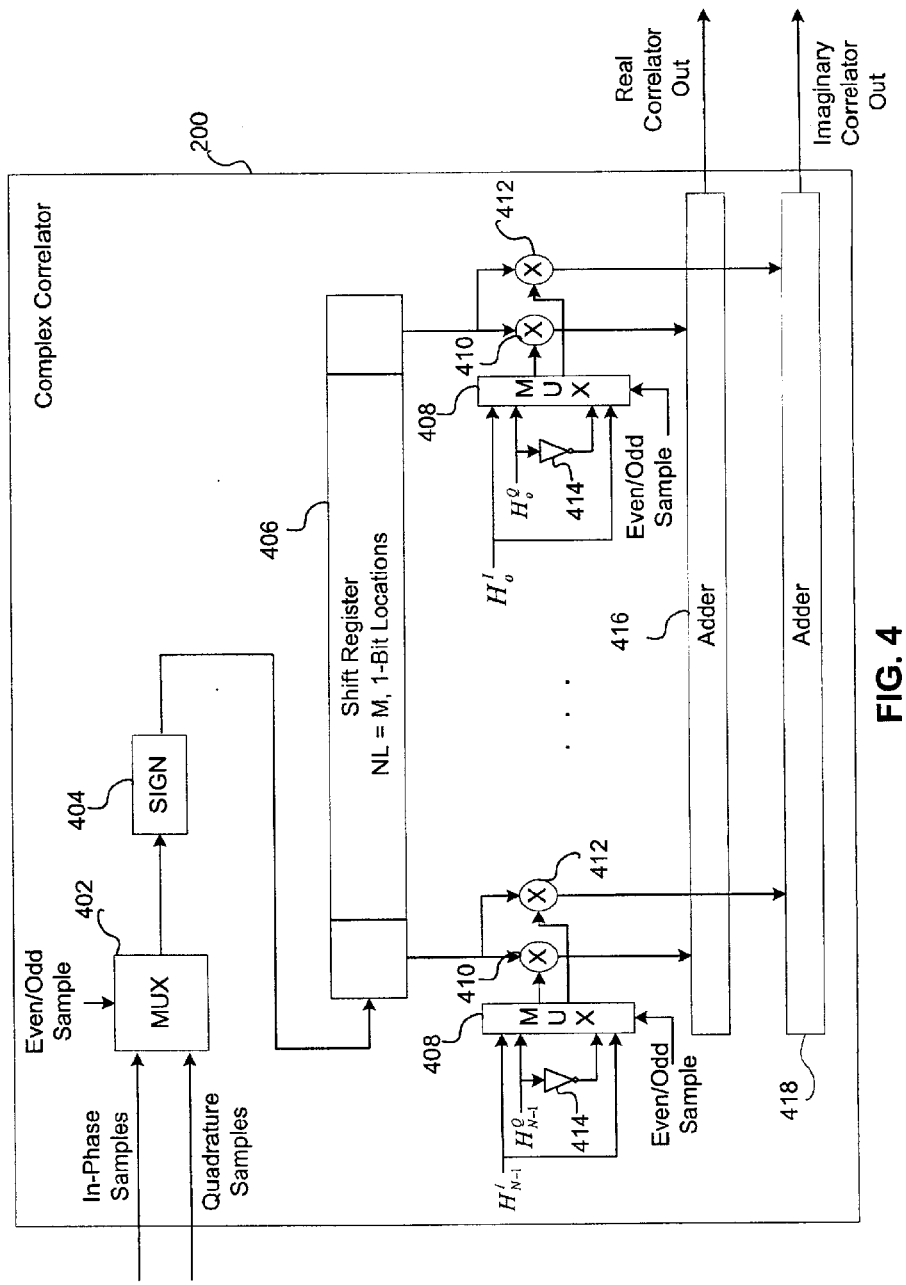
FIG. 4 is a block diagram of one embodiment of the complex correlator of FIG. 2, in accordance with the invention.

FIG. 4 is a block diagram of one embodiment of the complex correlator of FIG. 2, in accordance with the invention. The FIG. 4 embodiment of complex correlator 200 includes a mulitplexer (mux) 402, a sign 404 circuit, a shift register 406 having M=NL one-bit locations, a multiplier group 410 having N one-bit multipliers, a multiplier group 412 having N one-bit multipliers, a set of N muxes 408, a set of N inverters 414, and two adders 416 and 418. Mux 402 receives real and imaginary samples from the quadrature demodulator 118 (FIG. 1) and selectively outputs them to sign 404 circuit in response to a control signal "Even/Odd Sample." Specifically, when the control signal "Even/Odd Sample" is at a low voltage level (even sample), mux 402 outputs real samples and when the control signal "Even/Odd Sample" is at a high voltage level (odd sample), mux 402 outputs imaginary samples. Mux 402 selects every other real sample and every other imaginary sample because the sampling frequency of quadrature demodulator 134 is four times the carrier frequency. For example, in an HPNA 2.x standard, the carrier frequency $f_c$=7 MHz, so a receiver sampling rate $f_s$=28 MHz is chosen. With this choice of sampling frequency, every other sample (odd samples) of the real signal is zero, and every other sample (even samples) of the imaginary signal is zero.

Sign 404 circuit quantizes each sample to one bit by selecting the sign bit of each sample. Specifically, sign 404 circuit outputs a −1 when an input sample is less than 0, and outputs a 1 when an input sample is greater than or equal to 0. A high voltage level (set) may represent the −1 value and a low voltage level (clear) may represent the 1 value.

The quantized real and imaginary samples from sign 404 are sequentially shifted into shift register 406. Even though shift register 406 has M=LN one-bit locations, only N quantized samples at the $(LK)^{th}$ locations (K=0, 1, ..., N−1) are provided to the first and second multiplier groups 410 and 412 because among these M one-bit locations, (L−1)N positions are zero values due to the upsampling at transmitter 110.

In response to the control signal "Even/Odd Sample," mux group 408 selectively outputs known real coefficient $H_i^I$ to multiplier group 410 or multiplier group 412, and selectively outputs known imaginary coefficient $H_i^Q$ to multiplier group 412 or the inverted imaginary coefficient to multiplier group 410, for i from 0 to N−1. Specifically, when the control signal "Even/Odd Sample" is at a low voltage level (even sample), mux 408 outputs real coefficient $H_i^I$ to multiplier group 410 and outputs imaginary coefficient $H_i^Q$ to multiplier group 412. When the control signal "Even/Odd Sample" is at a high voltage level (odd sample), mux 408 outputs inverted imaginary coefficient $H_i^Q$ to multiplier group 410 and outputs real coefficient $H_i^I$ to multiplier group 412. In the FIG. 4 embodiment, each coefficient of the preamble is quantized to one bit as −1 or 1, so that with the 1-bit quantization of the received samples, each multiplier in multiplier groups 410 and 412 is implemented as a 2-bit comparator.

Each multiplier in multiplier group 410 outputs a 1 to adder 416 if its two inputs are the same, and outputs a 0 to adder 416 if its two inputs are different. Similarly, each multiplier in multiplier group 412 outputs a 1 to adder 418 if its two inputs are the same, and outputs a 0 to adder 418 if its two inputs are different. Adder 416 sums together the outputs from multiplier group 410 to generate a real output of complex correlator 200. Adder 418 sums together the outputs from multiplier group 412 to generate an imaginary output of complex correlator 200. These real and imaginary outputs are sent to low pass filters 202 and 204 (FIG. 2), respectively.

The FIG. 4 embodiment of complex correlator 200 is more efficient and less costly than complex correlator 300 of FIG. 3. The FIG. 4 embodiment advantageously uses 2N 1-bit multipliers, instead of the 4M (4NL) multipliers of complex correlator 300. This significant reduction in the number of multipliers provides significant cost savings. In addition, shift register 406 has a bit-width of one, which reduces memory costs.

Figure 5:
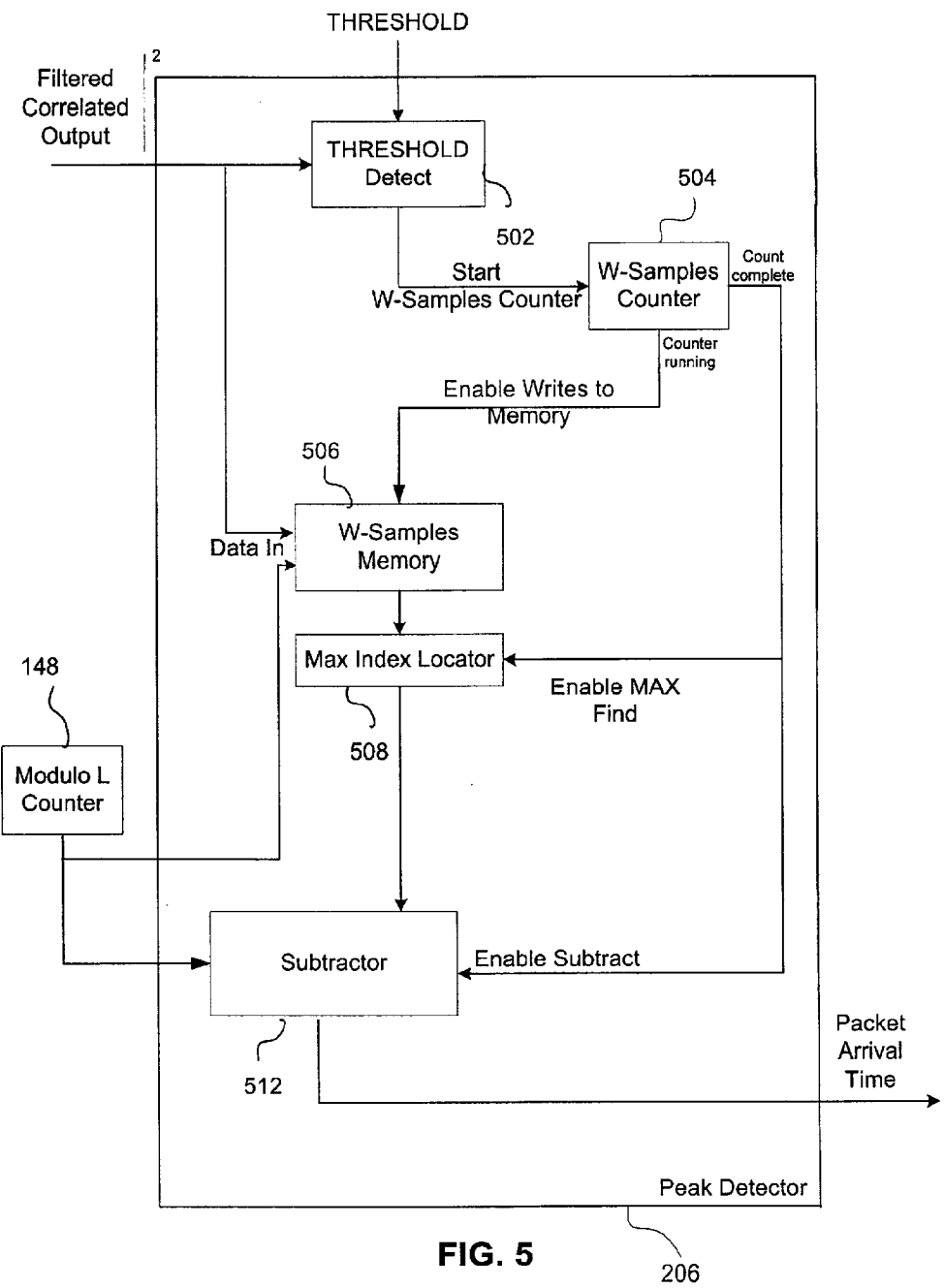
FIG. 5 is a block diagram of one embodiment of the peak detector of FIG. 2, in accordance with the invention.

FIG. 5 is a block diagram of one embodiment of the peak detector 206 of FIG. 2, in accordance with the invention. Peak detector 206 includes a threshold detector 502, a W-samples memory 506, an W-samples counter 504, a max index locator 508, and a subtractor 512. Threshold detector 502 receives a correlated output $|Y_n|^2$ from adder 208 (FIG. 2) and when the correlated output exceeds a pre-determined threshold level, outputs a start signal to W-samples counter 504 which instructs W-samples counter 504 to begin counting W samples. The W samples define a window size for examining the correlated output for peaks. The value of W-samples counter 504 activates an enable signal to W-samples memory 506 while W-samples counter 504 is counting. The enable signal instructs W-samples memory 506 to store W input values of $|Y_n|^2$ and their associated time of arrival as indicated by the value of modulo L counter 148.

During the time W-samples counter 504 is running, the correlated outputs $|Y_n|^2$ are saved in W-samples memory 506 along with the associated time index derived from modulo L counter 148. Each time W-samples counter 504 reaches W−1, it momentarily outputs an enable signal to max index locator 508 and subtractor 512. When enabled, max index locator 508 finds the index i where i=0, 1, ... (W−1), of the largest correlated output in W-samples memory 506. Max index locator 508 outputs this index i to subtractor 512. When enabled, subtractor 512 determines the difference between the index i and a value generated by modulo L counter 148. The difference between the value of modulo L counter 148 and the index i of the largest correlated output is a measure or estimation of PAT with respect to an L-sample symbol boundary. If this offset is non-zero, then the sample time of maximum correlation does not match with the output of L-times downsampler 140. In this case the delay in variable sample delay 146 is adjusted by the packet arrival time estimate. After this adjustment, the output of L-times downsampler 140 will match with the point of maximum correlation, which allows equalizer 144 (FIG. 1) to converge faster.

The packet arrival time as determined by PAT detector 142 is defined within or on a symbol boundary (one sample per symbol), not on some fraction of a symbol (multiple samples per symbol), even though equalizer 144 might be fractionally spaced. This feature is advantageous because an equalizer converges faster when presented with symbols that are aligned in time with the symbol period, whether or not the equalizer is fractionally spaced.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. An apparatus for detecting arrival time for a packet including a preamble, the apparatus comprising:
   a receiver for receiving and demodulating a signal; and
   a packet arrival time detector, coupled to the receiver, configured to correlate the demodulated received signal with a stored preamble and to output a packet arrival time at a symbol period boundary of the received signal, wherein the packet arrival time is used to adjust a variable sample delay of the demodulated received signal.

2. An apparatus for detecting arrival time for a packet including a preamble, the apparatus comprising:
   a receiver for receiving and demodulating a signal; and
   a packet arrival time detector, coupled to the receiver, configured to correlate the demodulated received signal with a stored preamble and to output a packet arrival time at a symbol period boundary of the received signal, wherein the packet arrival time detector further comprises:
   a correlator configured to correlate real and imaginary components of the demodulated received signal with real and imaginary components of the stored preamble to produce a real correlator output and an imaginary correlator output,
   a first low pass filter configured to filter the real correlator output;
   a second low pass filter configured to filter the imaginary correlator output;
   a first squaring device configured to square the filtered real correlator output;
   a second squaring device configured to square the filtered imaginary correlator output;
   an adder configured to sum the squared filtered real correlator output with the squared filtered imaginary correlator output to produce a correlated output, and
   a peak detector configured to detect a maximum value of the correlated output during a window of period W and to compare an index of the maximum value of the correlated output with a modulo-L counter value to produce the packet arrival time.

3. The apparatus of claim 2, wherein the correlator quantizes the real and imaginary components of the demodulated received signal to one bit.

4. The apparatus of claim 3, wherein the correlator quantizes the real and imaginary components of the demodulated received signal to one bit by selecting a sign bit of the real and imaginary components of the demodulated received signal.

5. The apparatus of claim 3, wherein the correlator multiplies the quantized real and imaginary components of the demodulated received signal with quantized real and imaginary components of the stored preamble using one-bit multipliers.

6. The apparatus of claim 5, wherein the one-bit multipliers are implemented as 2-bit comparators.

7. The apparatus of claim 2, wherein the correlator includes a shift register having NL locations, where N is the number of symbols in the preamble and L is a ratio of the sampling rate of the receiver to the symbol rate of the receiver.

8. The apparatus of claim 2, wherein the correlator includes two groups of N multipliers, where N is the number of symbols in the preamble.

9. The apparatus of claim 2, wherein the peak detector includes
   a threshold detector configured to compare the correlated output with a predetermined threshold and to output an enable signal when the correlated output exceeds the predetermined threshold,
   a memory configured to store the correlated output when enabled by the enable signal from the threshold detector, and
   a maximum index locator to locate the index of the maximum value of the correlated output stored in the memory.

10. The apparatus of claim 2, wherein the packet arrival time detector outputs the packet arrival time to an equalizer.

11. The apparatus of claim 2, wherein a sampling frequency of the receiver is chosen such that every other sample of a real component of the demodulated received signal is zero and every other sample of an imaginary component of the demodulated received signal is zero, where the real component of the demodulated received signal is skewed one sample from the imaginary component of the demodulated received signal.

12. A method for detecting arrival time of a packet including a preamble, the method comprising the steps of:
   receiving and demodulating a signal;
   correlating the demodulated received signal with a stored preamble to produce a correlated output;
   detecting a maximum of the correlated output during a window of period W; and
   comparing an index of the maximum with the output of a modulo-L counter to produce a packet arrival time at a symbol period boundary of the received signal.

13. The method of claim 12, further comprising the step of using the packet arrival time to adjust a variable sample delay of the demodulated received signal.

14. A method for detecting arrival time of a packet including a preamble, the method comprising the steps of:
   receiving and demodulating a signal;
   correlating the demodulated received signal with a stored preamble to produce a correlated output, wherein correlating includes correlating real and imaginary components of the demodulated received signal with real and imaginary components of the stored preamble to produce a real correlator output and an imaginary correlator output, and summing the real correlator output with the imaginary correlator output to produce the correlated output;

detecting a maximum of the correlated output during a window of period W; and comparing an index of the maximum with the output of a modulo-L counter to produce a packet arrival time at a symbol period boundary of the received signal.

15. The method of claim 14, wherein the real correlator output and the imaginary correlator output are low pass filtered and squared prior to being summed.

16. The method of claim 14, wherein the step of correlating includes quantizing the real and imaginary components of the demodulated received signal to one bit.

17. The method of claim 16, wherein quantizing the real and imaginary components of the demodulated received signal includes selecting a sign bit of the real and imaginary components of the demodulated received signal.

18. The method of claim 16, wherein the step of correlating includes multiplying the quantized real and imaginary components of the demodulated real and imaginary components with quantized real and imaginary components of the stored preamble using one-bit multipliers.

19. The method of claim 18, wherein the one-bit multipliers are implemented as 2-bit comparators.

20. A method for detecting arrival time of a packet including a preamble, the method comprising the steps of:

receiving and demodulating a signal;

correlating the demodulated received signal with a stored preamble to produce a correlated output;

detecting a maximum of the correlated output during a window of period W; and comparing an index of the maximum with the output of a modulo-L counter to produce a packet arrival time at a symbol period boundary of the received signal, wherein a sampling frequency of the received demodulated signal is chosen such that every other sample of a real component of the received demodulated signal is zero and every other sample of an imaginary component of the received demodulated signal is zero, where the real component of the received demodulated signal is skewed one sample from the imaginary component of the received demodulated signal.

21. A system for detecting arrival time of a packet including a preamble, comprising:

means for receiving and demodulating a signal;

means for correlating the demodulated received signal with a stored preamble to produce a correlated output, wherein correlating includes correlating real and imaginary components of the demodulated received signal with real and imaginary components of the stored preamble to produce a real correlator output and an imaginary correlator output, and summing the real correlator output with the imaginary correlator output to produce the correlated output;

means for detecting a maximum of the correlated output during a window of period W; and means for comparing an index of the maximum with the output of a modulo-L counter to produce a packet arrival time at a symbol period boundary of the received signal.

* * * * *